(12) United States Patent
Kim

(10) Patent No.: US 9,549,450 B2
(45) Date of Patent: *Jan. 17, 2017

(54) PIXEL AND ORGANIC LIGHT EMITTING DISPLAY DEVICE USING THE SAME

(71) Applicant: Dong-Hwi Kim, Yongin (KR)

(72) Inventor: Dong-Hwi Kim, Yongin (KR)

(73) Assignee: SAMSUNG DISPLAY CO., LTD., Yongin, Gyunggi-do (KR)

(*) Notice: Subject to any disclaimer, the term of this patent is extended or adjusted under 35 U.S.C. 154(b) by 581 days.

This patent is subject to a terminal disclaimer.

(21) Appl. No.: 13/666,230

(22) Filed: Nov. 1, 2012

(65) Prior Publication Data

US 2014/0027719 A1    Jan. 30, 2014

(30) Foreign Application Priority Data

Jul. 25, 2012  (KR) .................. 10-2012-0081259

(51) Int. Cl.
| | | |
|---|---|---|
| *G09G 3/30* | (2006.01) | |
| *H05B 33/08* | (2006.01) | |
| *G09G 3/32* | (2016.01) | |

(52) U.S. Cl.
CPC ........ *H05B 33/0896* (2013.01); *G09G 3/3241* (2013.01); *G09G 3/3225* (2013.01); *G09G 3/3233* (2013.01); *G09G 2300/0809* (2013.01); *G09G 2300/0842* (2013.01); *G09G 2320/02* (2013.01); *G09G 2320/0238* (2013.01)

(58) Field of Classification Search
CPC .. G09G 3/3241; G09G 3/3225; G09G 3/3233; G09G 2300/0842; G09G 2300/0809; G09G 2320/0238; G09G 2320/02

USPC .................................. 345/76–83; 315/169.3
See application file for complete search history.

(56) References Cited

U.S. PATENT DOCUMENTS

| | | |
|---|---|---|
| 2003/0103022 A1 | 6/2003 | Noguchi et al. |
| 2005/0259093 A1 | 11/2005 | Osame et al. |
| 2006/0022305 A1 | 2/2006 | Yamashita |
| 2006/0022907 A1 | 2/2006 | Uchino et al. |
| 2008/0036704 A1 | 2/2008 | Kim et al. |
| 2008/0169460 A1* | 7/2008 | Yoo ................................ 257/40 |
| 2009/0273547 A1 | 11/2009 | Tanikame et al. |
| 2009/0315870 A1 | 12/2009 | Goh et al. |
| 2010/0013816 A1* | 1/2010 | Kwak ........................... 345/211 |
| 2012/0001893 A1 | 1/2012 | Jeong et al. |
| 2012/0001896 A1 | 1/2012 | Han et al. |

(Continued)

FOREIGN PATENT DOCUMENTS

| | | |
|---|---|---|
| CN | 101800024 A | 8/2010 |
| CN | 102063861 A | 5/2011 |

(Continued)

OTHER PUBLICATIONS

European Search Report dated Sep. 19, 2013.
Partial European Search Report dated Jun. 24, 2013.

*Primary Examiner* — Jimmy H Nguyen
(74) *Attorney, Agent, or Firm* — Lee & Morse P.C.

(57) ABSTRACT

A pixel includes an organic light emitting diode, a first transistor that controls an amount of current supplied to the organic light emitting diode, a second transistor connected between a gate electrode of the first transistor and an initialization power supply, and a third transistor diode-connected between an anode electrode of the organic light emitting diode and the initialization power supply.

15 Claims, 3 Drawing Sheets

(56) References Cited

U.S. PATENT DOCUMENTS

2012/0019498 A1    1/2012    Jeong et al.
2013/0201172 A1*   8/2013    Jeong .................. G09G 3/3233
                                                      345/212

FOREIGN PATENT DOCUMENTS

| | | |
|---|---|---|
| JP | 2003-186437 A | 7/2003 |
| JP | 2010-217661 A | 9/2010 |
| JP | 2010-286526 A | 12/2010 |
| KR | 10-2007-0102070 A | 10/2007 |
| KR | 10-0739335 | 2/2008 |
| KR | 10-2011-0078787 A | 7/2011 |
| KR | 10-2011-0080387 A | 7/2011 |
| KR | 10-2012-0002070 | 1/2012 |
| KR | 10-2012-0008085 | 1/2012 |
| KR | 10-2012-0009904 | 2/2012 |
| WO | WO 2007/111202 A1 | 10/2007 |

* cited by examiner

PIXEL AND ORGANIC LIGHT EMITTING DISPLAY DEVICE USING THE SAME

CROSS-REFERENCE TO RELATED APPLICATION

This application claims priority under 35 U.S.C. §119 to Korean Patent Application No. 10-2012-0081259, filed on Jul. 25, 2012, in the Korean Intellectual Property Office, the entire contents of which are incorporated herein by reference.

BACKGROUND

Various flat panel display devices capable of reducing weight and volume have been developed. As these flat panel display devices, there are a liquid crystal display (LCD), a field emission display (FED), a plasma display panel (PDP), an organic light emitting display (OLED), and the like.

Among them, the organic light emitting display device, which displays an image using an organic light emitting diode generating light by recombination between electrons and holes, has advantages in which it has a rapid response speed and may be driven at a low power.

SUMMARY

Embodiments may be realized by providing a pixel that includes an organic light emitting diode, a first transistor controlling an amount of current supplied to the organic light emitting diode, a second transistor connected between a gate electrode of the first transistor and an initialization power supply, and a third transistor diode-connected between an anode electrode of the organic light emitting diode and the initialization power supply.

A gate electrode of the third transistor may be connected to the anode electrode of the organic light emitting diode. The gate electrode of the third transistor may be connected to the gate electrode of the first transistor. The initialization power supply may be set to a voltage lower than a voltage applied to the anode electrode of the organic light emitting diode. A voltage applied to the gate electrode of the first transistor may be set to a voltage higher than the voltage applied to the anode electrode of the organic light emitting diode.

The pixel may further include a fourth transistor connected between a second electrode of the first transistor connected to the anode electrode of the organic light emitting diode and the gate electrode of the first transistor, and turned on after the second transistor is turned on. The pixel may include a fifth transistor connected between the a first electrode of the first transistor and a data line, and turned on and turned off simultaneously with the fourth transistor. The pixel may include a sixth transistor connected between the first electrode of the first transistor and a first power supply, and turned off when the second and fourth transistors are turned on and turned on during other period of time. The pixel may include a seventh transistor connected to the second electrode of the first transistor and the organic light emitting diode, and turned on and turned off simultaneously with the sixth transistor. The pixel may further include a storage capacitor connected between the gate electrode of the first transistor and the first power supply.

Embodiments may be realized by providing an organic light emitting display device that includes a scan driving unit supplying scan signals to scan lines and supplying light emitting control signals to light emitting control lines, a data driving unit supplying a data signal to data lines, and pixels positioned at intersections of the scan lines and the data lines. The pixel includes an organic light emitting diode, a first transistor controlling an amount of current supplied to the organic light emitting diode, a second transistor connected between a gate electrode of the first transistor and an initialization power supply and turned on when the scan signal is supplied to a previous scan line, and a third transistor diode-connected between an anode electrode of the organic light emitting diode and the initialization power supply.

A gate electrode of the third transistor may be connected to the anode electrode of the organic light emitting diode. The gate electrode of the third transistor may be connected to the gate electrode of the first transistor. The initialization power supply may be set to a voltage lower than a voltage applied to the anode electrode of the organic light emitting diode. The data signal may be set to a voltage lower than the voltage applied to the anode electrode of the organic light emitting diode.

The organic light emitting display device may further include a fourth transistor connected between a second electrode of the first transistor connected to the anode electrode of the organic light emitting diode and the gate electrode of the first transistor, and turned on when the scan signal is supplied to a current scan line. The pixel may include a fifth transistor connected between the first electrode of the first transistor and a data line, and turned on when the scan signal is supplied to the current scan line. The pixel may include a sixth transistor connected between the first electrode of the first transistor and a first power supply, and turned off when the light emitting control signal is supplied to a current light emitting control line and turned on in other case. The pixel may include a seventh transistor connected to the second electrode of the first transistor and the organic light emitting diode, and turned off when the light emitting control signal is supplied to the current light emitting control line and turned on in other case.

The previous scan line may be an i–1-th scan line, the current scan line is an i-th scan line, and the current light emitting line is an i-th light emitting control line. The scan driving unit may supply the light emitting control signal to the current light emitting control line so as to overlap the light emitting control signals with scan signals supplied to the previous scan line and the current scan line. The organic light emitting display device may further include a storage capacitor connected between the gate electrode of the first transistor and the first power supply.

BRIEF DESCRIPTION OF THE DRAWINGS

The accompanying drawings, together with the specification, illustrate exemplary embodiments of the present device, and, together with the description, serve as an explanation.

DETAILED DESCRIPTION

Figure 1:
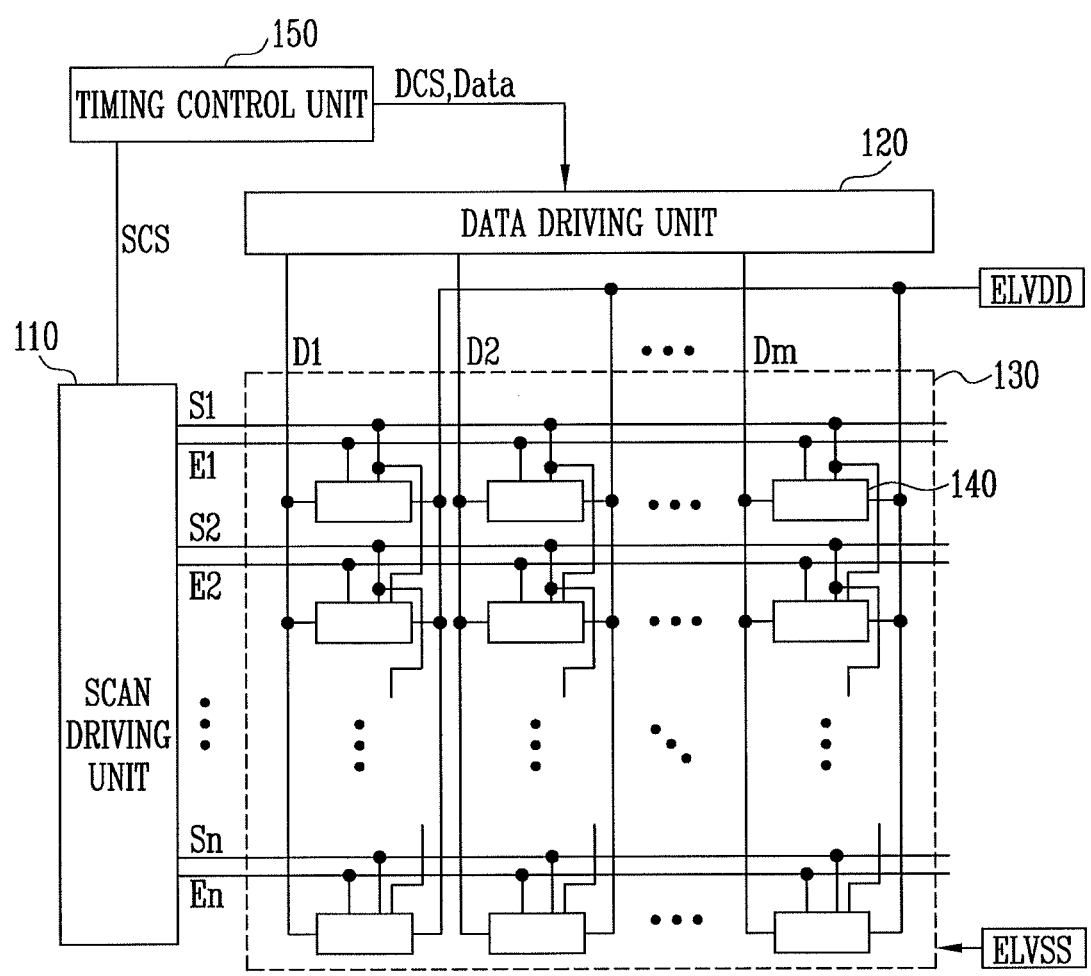
FIG. 1 is a view showing an organic light emitting display device according to an exemplary embodiment.

Korean Patent Application No. 10-2012-0081259, filed on Jul. 25, 2012, in the Korean Intellectual Property Office, and entitled: "Pixel and Organic Light Emitting Display Device" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

FIG. 1 is a view showing an organic light emitting display device according to an exemplary embodiment.

Referring to FIG. 1, the organic light emitting display device according to the first exemplary embodiment is configured to include a pixel unit 130 including pixels 140 positioned at intersections of scan lines S1 to Sn and data lines D1 to Dm, a scan driving unit 110 driving the scan lines S1 to Sn and light emitting control lines E1 to En, a data driving unit 120 driving the data lines D1 to Dm, and a timing control unit 150 controlling the data driving unit 120.

The timing control unit 150 generates a data driving control signal DCS and a scan driving control signal SCS corresponding to synchronized signals supplied from the outside. The data driving control signal DCS generated in the timing control unit 150 is supplied to the data driving unit 120, and the driving control signal SCS is supplied to the scan driving unit 110. In addition, the timing control unit 150 supplies data supplied from the outside to the data driving unit 120.

The scan driving unit 110 receives a scan driving control signal SCS, e.g., from the timing control unit 150. The scan driving unit 110, receiving the scan driving control signal SCS, generates a scan signal and supplies the generated scan signal sequentially to the scan lines S1 to Sn. In addition, the scan driving unit 110 generates a light emitting control signal in response to the scan control signal SCS and supplies the generated light emitting control signal sequentially to the light emitting control lines E1 to En. The light emitting control signal is set to have a width that is the same as or wider than that of the scan signal. For example, the light emitting controlling signal supplied to the i-th light emitting line Ei (i is a natural number) is overlapped with scan signals supplied to the i−1-th and the i-th scan lines Si−1 and Si.

The data driving unit 120 receives the data driving control signal DCS, e.g., from the timing control unit 150. The data driving unit 120 receiving the data driving control signal DCS generates the data signal and supplies the generated data signal to the data lines D1 to Dm so as to synchronize with the scan signals.

The pixel unit 130 receives powers of a first power supply ELVDD and a second power ELVSS from the outside and supplies the powers to each of pixels 140. Each of the pixels 140 receiving powers of the first and second power supplies ELVDD and ELVSS generates light corresponding to the data signal.

Figure 2:
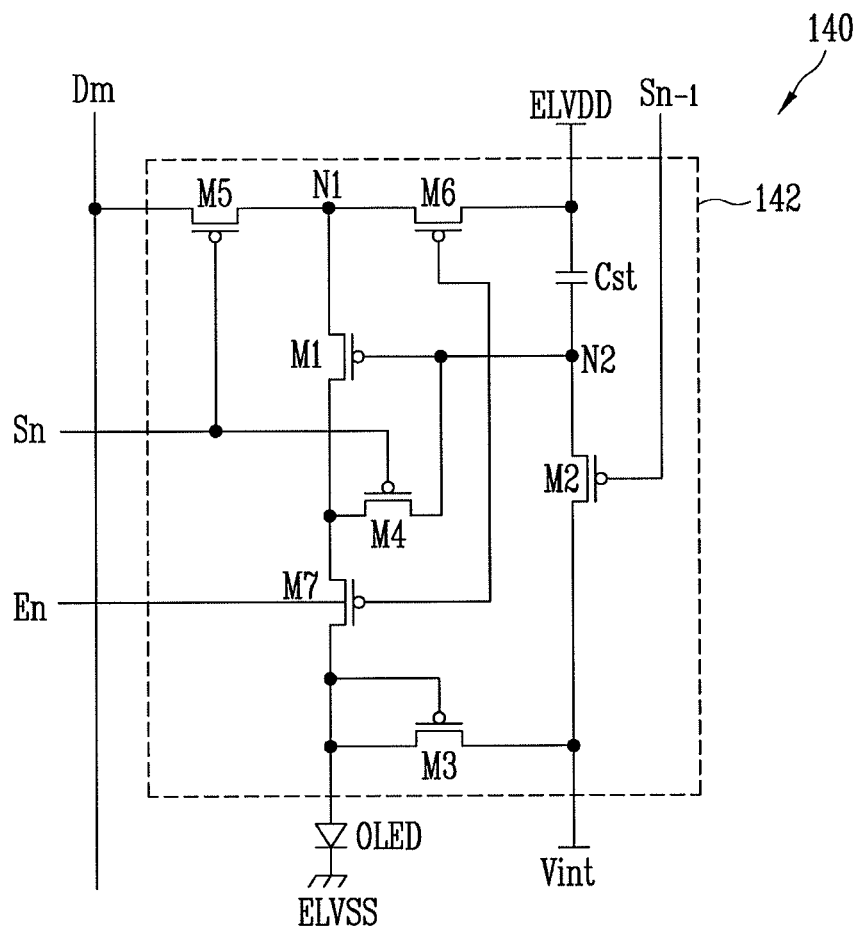
FIG. 2 is a view showing an exemplary embodiment of a pixel shown in FIG. 1.

FIG. 2 is a view showing a first exemplary embodiment of a pixel shown in FIG. 1. In FIG. 2, for convenience of explanation, a pixel connected to an m-th data line Dm, an n−1-th scan line Sn, an n-th scan line Sn, and an n-th light emitting control line En is shown.

Referring to FIG. 2, the pixel 140 according to the first exemplary embodiment includes a pixel circuit 142 connected to the organic light emitting diode (OLED), the data line Dm, the scan lines Sn−1 and Sn, and the light emitting control line En to control an amount of current supplied to the OLED.

An anode electrode of the OLED is connected to the pixel circuit 142, and a cathode electrode thereof is connected to the second power supply ELVSS. The second power supply ELVSS is set to have a voltage value lower than that of the first power supply ELVDD. The OLED described above generates light having a predetermined luminance corresponding to the amount of current supplied from the pixel circuit 142.

The pixel circuit 142 controls an amount of current supplied to the OLED corresponding to the data signal supplied to the data line Dm when the scan signal is supplied to the scan line Sn. To this end, the pixel circuit 142 includes first to seventh transistors M1 to M7 and a storage capacitor Cst.

A first electrode of the fifth transistor M5 is connected to the data line Dm and a second electrode thereof is connected to a first node N1. In addition, a gate electrode of the fifth transistor M5 is connected to the n-th scan line Sn. The fifth transistor M5 described above is turned on when the scan signal is supplied to the n-th scan line Sn to supply the data signal supplied to the data line Dm to the first node N1.

A first electrode of the first transistor M1 is connected to the first node N1, and a second electrode thereof is connected to a first electrode of the seventh transistor M7. In addition, a gate electrode of the first transistor M1 is connected to the second node N2. The first transistor M1 described above supplies current corresponding to the voltage charged in the storage capacitor Cst to the OLED.

A first electrode of the second transistor M2 is connected to the second node N2 and a second electrode thereof is connected to an initialization power supply Vint. In addition, a gate electrode of the second transistor M2 is connected to the n−1-th scan line Sn−1. The second transistor M2 described above is turned on when the scan signal is supplied to the n−1-th scan lines Sn−1 to supply voltage of the initialization power supply Vint to the second node N2. The initialization power supply Vint may be set to have a voltage lower than that of the data signal.

A first electrode of the third transistor M3 is connected to the initialization power supply Vint. Further, both a second electrode and a gate electrode of the third transistor M3 are connected to the anode electrode of the OLED. That is, the third transistor M3 is diode-connected, e.g., reverse-diode-connected, so that current may flow from the initialization power supply Vint to the anode electrode of the OLED. In one case, the anode electrode of the OLED may be set to a voltage higher than that of the initialization power supply Vint, and the third transistor M3 may maintain a turn-off state.

Since a voltage of the anode electrode of the OLED is set higher than that of the initialization power supply Vint, a leakage path of current leading from the anode electrode of the OLED to the initialization power supply Vint via the third transistor M3 may be formed. That is, the leakage current may flow from the OLED to the initialization power supply Vint via the third transistor M3, and this may allow a desired black image to be displayed. In other words, at the time of displaying the black image, a predetermined leakage current flows through the leakage path created by the third transistor M3, thereby making it possible to minimize light emitting of the OLED.

A first electrode of the fourth transistor M4 is connected to a second electrode of the first second transistor M1, and a second electrode of the fourth transistor M4 is connected to the second node N2. In addition, a gate electrode of the fourth transistor M4 is connected to the n-th scan line Sn.

When the scan signal is supplied to the n-th scan line Sn the fourth transistor M4 is turned on to diode-connect the first transistor M1.

A first electrode of the sixth transistor M6 is connected to the first power supply ELVDD and a second electrode thereof is connected to the first node N1. In addition, a gate electrode of the sixth transistor M6 is connected to the light emitting control line En. The sixth transistor M6 is turned off when the light emitting control signal is supplied to the light emitting control line En and turned on when the light emitting control signal is not supplied thereto.

A first electrode of the seventh transistor M7 is connected to the second electrode of the first transistor M1, and a second electrode thereof is connected to the anode electrode of the OLED. In addition, a gate electrode of the seventh transistor M7 is connected to the light emitting control line En. The seventh transistor M7 is turned off when the light emitting control signal is supplied to the light emitting control line En and turned on when the light emitting control signal is not supplied thereto.

Figure 3:
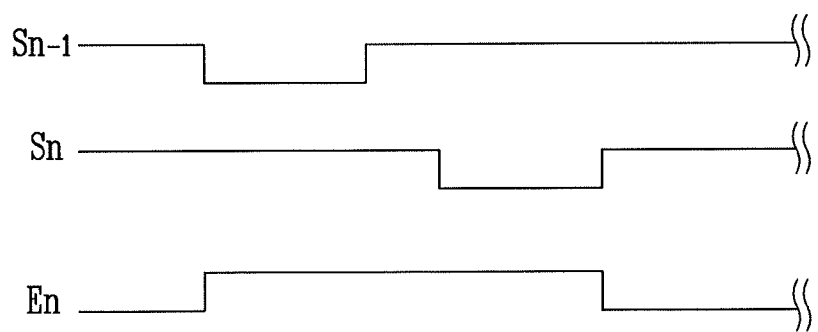
FIG. 3 a waveform diagram showing a method of driving the pixel shown in FIG. 2.

FIG. 3 a waveform diagram showing a method of driving the pixel shown in FIG. 2.

Referring to FIG. 3, firstly the light emitting control signal is supplied to the light emitting control line En to turn off the sixth transistor M6 and the seventh transistor M7. When the sixth transistor M6 is turned off, the first power supply ELVDD and the first node N1 are electrically blocked. When the seventh transistor M7 is turned off, the first transistor M1 and the OLED are electrically blocked. That is, during a period of time supplying of the light emitting control signal, the pixel 140 is set to a non-light-emitting state.

Thereafter, the scan signal is supplied to the n−1-th scan line Sn−1. When the scan signal is supplied to the n−1-th scan line Sn−1, the second transistor M2 is turned on. When the second transistor M2 is turned on, voltage of the initialization power supply Vint is supplied to the second node N2.

After the voltage of the initialization power supply Vint is supplied to the second node N2, the scan signal is supplied to the n-th scan line Sn. When the scan signal is supplied to the n-th scan line Sn, the fourth and fifth transistors M4 and M5 are turned on.

When the fourth transistor M4 is turned on, the first transistor M1 is diode-connected. When the fifth transistor M5 is turned on, the data signal supplied from the data line Dm is supplied to the first node N1. Here, since the second node N2 has been initialized to the voltage of initialization power supply Vint, the first transistor M1 is turned on. In this case, a voltage obtained by subtracting a threshold voltage from the voltage of the data signal applied to the first node N1 is applied to the second node N2, and the storage capacitor Cst stores the voltage applied to the second node N2.

After a predetermined voltage is charged in the storage capacitor Cst, the supply of the light emitting controlling signal to the light emitting controlling line En is interrupted, such that the sixth and seventh transistors M6 and M7 are turned on. When the sixth and seventh transistors M6 and M7 are turned on, a current path is formed from the first power supply ELVDD and the second power supply ELVSS via the OLED. The first transistor M1 controls the amount of current flowing from the first power supply ELVDD to the OLED, e.g., corresponding to the voltage charged in the storage capacitor Cst.

A predetermined amount of leakage current may flow from the OLED to the first power supply Vint by way of the third transistor M3 that is reverse-diode-connected. If the OLED emits light, when a large amount of current is supplied to the OLED, the leakage current may not have an effect on luminance. When a black grayscale is implemented, a fine amount of current is supplied from the pixel circuit 142 to the OLED. In this case, the leakage current of the third transistor M3 may have a large effect on light emitting of the OLED. Accordingly, when the black grayscale is implemented, the OLED may be prevented from emitting light by the leakage current by way of the third transistor M3, according to an exemplary embodiment.

As described above, according to the first exemplary embodiment, when the black luminance is implemented the OLED may be prevented from emitting light, thereby making it possible to improve contrast ratio. Additionally, the gate electrode of the third transistor M3, according to the first exemplary embodiment, is not connected to and/or is electrically separated from a separate signal line. As described above when the third transistor M3 is not connected to the separated signal line, a degree of freedom in design may be increased and a waste of mounting space due to signal line routing may be avoided.

Figure 4:
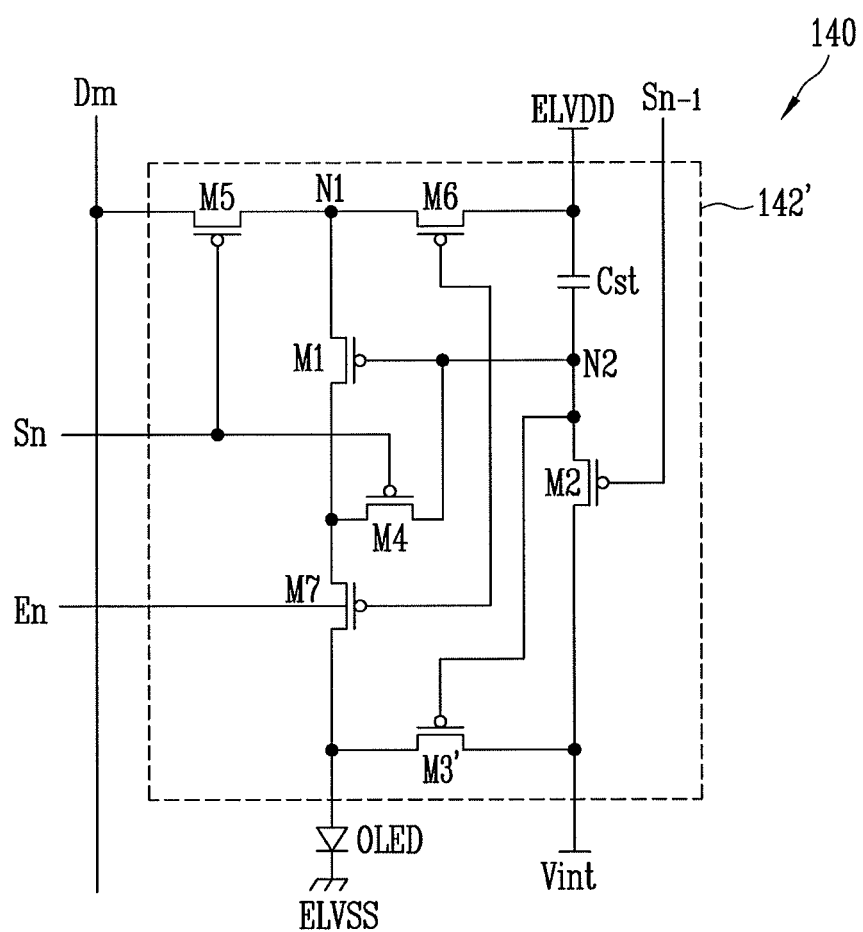
FIG. 4 is a view showing an exemplary embodiment of the pixel shown in FIG. 1.

FIG. 4 is a view showing a second exemplary embodiment of a pixel shown in FIG. 1. In FIG. 4, the same reference numerals will be used to designate the same components as those of FIG. 2. Therefore a detailed description thereof will be omitted.

Referring to FIG. 4, a pixel according to the second exemplary embodiment is configured to include a pixel circuit 142' and an organic light emitting diode (OLED).

An anode electrode of the OLED is connected to the pixel circuit 142', and a cathode electrode thereof is connected to a second power supply ELVSS. The OLED described above generates light having a predetermined luminance corresponding to the amount of current supplied from the pixel circuit 142'.

The pixel circuit 142' controls an amount of current supplied to the OLED corresponding to a data signal supplied to a data line Dm when a scan signal is supplied to a scan line Sn.

A third transistor M3' included in the pixel circuit 142' initialize the anode electrode of the OLED and form a leakage path of current leading from the OLED to an initialization power supply Vint, allowing a desired black image to be displayed.

To this end, a first electrode of the third transistor M3' is connected to the anode electrode of the OLED, and a second electrode thereof is connected to the initialization power supply Vint. In addition, a gate electrode of the third transistor M3' is connected to a second node N2.

Hereinafter operating processes of the second exemplary embodiment will be described in detail in connection with FIGS. 3 and 4, firstly a light emitting control signal is supplied to a light emitting control line En to turn off a sixth transistor M6 and a seventh transistor M7. When the sixth transistor M6 is turned off, the first power supply ELVDD and a first node N1 are electrically blocked. When the seventh transistor M7 is turned off, the first transistor M1 and the OLED are electrically blocked. That is, during supplying of the light emitting signal, the pixel 140 is set to a non-light-emitting state.

Thereafter, the scan signal is supplied to a n−1-th scan line Sn−1. When the scan signal is supplied to the n−1-th scan line Sn−1, a second transistor M2 is turned on. When the second transistor M2 is turned on, voltage of the initialization power supply Vint is supplied to the second node N2. In addition, when the second transistor M2 is turned on, a third transistor M3' is diode-connected. Here, the third transistor M3' is diode-connected so that current may flow from the anode electrode of the OLED to the initialization power supply Vint.

In this case, voltage at the anode electrode of the OLED drops approximately to the voltage of the initialization power supplies Vint. That is, during a period in which the scan signal is supplied to the n–1-th scan line Sn–1, the initialization power supply Vint is supplied to the anode electrode of the OLED to initialize the OLED, thereby making it possible to prevent deterioration of the OLED and increase the life span of the OLED.

After the voltage of the initialization power supply Vint is supplied to the second node N2, the scan signal is supplied to an n-th scan line Sn. When the scan signal is supplied to the n-th scan line Sn, fourth and fifth transistors M4 and M5 are turned on.

When the fourth transistor M4 is turned on, the first transistor M1 is diode-connected. When the fifth transistor M5 is turned on, the data signal supplied from the data line Dm is supplied to the first node N1. Here, since the second node N2 has been initialized to the voltage of initialization power supply Vint, the first transistor M1 is turned on. In this case, a voltage obtained by subtracting a threshold voltage from the voltage of the data signal applied to the first node N1 is applied to the second node N2, and a storage capacitor Cst stores the voltage applied to the second node N2.

After a predetermined voltage is charged in the storage capacitor Cst, the supply of the light emitting controlling signal to the light emitting controlling line En is interrupted, such that the sixth and seventh transistors M6 and M7 are turned on. When the sixth and seventh transistors M6 and M7 are turned on, a current path is formed from the first power supply ELVDD and the second power supply ELVSS via the OLED. Here, the first transistor M1 controls the amount of current flowing from the first power supply ELVDD to the OLED corresponding to the voltage charged in the storage capacitor Cst.

The voltage of the data signal may be set higher than the voltage applied to the anode electrode of the OLED. For example, in the case in which the second power supply is set to about –4V, a voltage of about –1V is applied to the anode electrode of the OLED. In addition, the data signal may be set to a voltage of about 4V or more. Therefore, during a driving period of time, the third transistor M3' is set to be a turn-off state.

When the third transistor M3' is set to the turn-off state, a leakage current may flow from the OLED to the initialization power supply Vint during the driving period. If the OLED emits light, a large amount of current may be supplied to the OLED, and as a result the leakage current may have less of an effect on luminance. On the other hand, in the case in which a black grayscale is displayed, a low current is supplied to the OLED, thereby making it possible that the OLED may be prevented from emitting light by the leakage current.

That is, according to the second exemplary embodiments, a desired black luminance may be implemented by the leakage current of the third transistor M3' which is present between the OLED and the initialization power supply Vint and set to the turn-off state, thereby making it possible to improve contrast ratio. In addition, the gate electrode of the third transistor M3' is not connected to a separate signal line. As described above when the third transistor M3' is not connected to the separated signal line, a degree of freedom in design may be increased and a waste of mounting space due to signal line routing may be avoided.

By way of summation and review, an organic light emitting display device includes a plurality of data lines, scan lines, and a plurality of pixels arranged in the form of a matrix at intersections of the power lines. The pixels each include an organic light emitting diode and a driving transistor controlling an amount of current flowing to the organic light emitting diode. Current provided from the driving transistors to the organic light emitting diode corresponds to a data signal to generate light having a predetermined luminance.

Due to increases in efficiency and resolution of the organic light emitting diode, the emission of light, even at a low current level, may be achieved. For example, images having high luminance may be displayed with low power consumption. However, when the organic light emitting diode easily emits light at a low current level, a black luminance may be increased. That is, when black is displayed in the pixel, fine light emission may be generated in the organic light emitting diode due to leakage current, such that the contrast ratio of the display device may be reduced.

In contrast, embodiments relate to a pixel and an organic light emitting display device using the same in which a pixel is capable of improving contrast ratio. As set forth above, in the pixel and the organic light emitting display device, a leakage path of current leading from the organic light emitting diode to the initialization power supply may be formed. In this case, leakage current flows from the organic light emitting diode to the initialization power supply, and accordingly an amount of current supplied to the organic light emitting diode at the time of displaying black is minimized, thereby making it possible to improve contrast ratio.

The leakage path may include a transistor that is formed to be diode-connected. Further, the gate electrode of the transistor forming the leakage path may not be connected to a separate signal line, thereby making it possible to minimize a waste of mounting space due to signal line routing.

While embodiments have been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A pixel, comprising:
   an organic light emitting diode;
   a first transistor that controls an amount of current supplied to the organic light emitting diode;
   a second transistor connected between a gate electrode of the first transistor and an initialization power supply; and
   a third transistor being directly connected between an anode electrode of the organic light emitting diode and the initialization power supply and including a first electrode and a second electrode, wherein:
   the first electrode of the third transistor is electrically connected to the anode electrode of the organic light emitting diode, and
   the second electrode of the third transistor is electrically connected to the initialization power supply, and wherein
   when the third transistor is reverse-diode-connected, a leakage current flows from the anode electrode of the organic light emitting diode to the initialization power supply through the third transistor being reverse-diode-connected.

2. The pixel according to claim 1, wherein the gate electrode of the third transistor is connected to the gate electrode of the first transistor.

3. The pixel according to claim 1, wherein the initialization power supply is set to a voltage lower than a voltage applied to the anode electrode of the organic light emitting diode.

4. The pixel according to claim 1, wherein a voltage applied to the gate electrode of the first transistor is set to a voltage higher than a voltage applied to the anode electrode of the organic light emitting diode.

5. The pixel according to claim 1, further comprising:
a fourth transistor connected between the gate electrode of the first transistor and a second electrode of the first transistor, the fourth transistor being turned on after the second transistor is turned on;
a fifth transistor connected between a first electrode of the first transistor and a data line, the fifth transistor being turned on and turned off simultaneously with the fourth transistor;
a sixth transistor connected between the first electrode of the first transistor and a first power supply, the sixth transistor being turned off during a period of time when the second and fourth transistors are turned on and being turned on during another period of time; and
a seventh transistor connected to the second electrode of the first transistor and the organic light emitting diode, the seventh transistor being turned on and turned off simultaneously with the sixth transistor.

6. The pixel according to claim 5, further comprising a storage capacitor connected between the gate electrode of the first transistor and the first power supply.

7. The pixel according to claim 1, wherein a gate electrode of the third transistor is electrically and directly connected to the anode electrode of the organic light emitting diode.

8. An organic light emitting display device, comprising:
a scan driving unit that supplies scan signals to scan lines and that supplies light emitting control signals to light emitting control lines;
a data driving unit that supplies a data signal to data lines; and
pixels positioned at intersections of the scan lines and the data lines, each of the pixels including:
an organic light emitting diode;
a first transistor that controls an amount of current supplied to the organic light emitting diode;
a second transistor connected between a gate electrode of the first transistor and an initialization power supply, the second transistor being turned on when one of the scan signals is supplied to a previous scan line; and
a third transistor being directly connected between an anode electrode of the organic light emitting diode and the initialization power supply and including a first electrode and a second electrode, wherein:
the first electrode of the third transistor is electrically connected to the anode electrode of the organic light emitting diode, and
the second electrode of the third transistor is electrically connected to the initialization power supply, and wherein
when the third transistor is reverse-diode-connected, a leakage current flows from the anode electrode of the organic light emitting diode to the initialization power supply through the third transistor being reverse-diode-connected.

9. The organic light emitting display device according to claim 8, wherein the gate electrode of the third transistor is connected to the gate electrode of the first transistor.

10. The organic light emitting display device according to claim 8, wherein the initialization power supply is set to a voltage lower than a voltage applied to the anode electrode of the organic light emitting diode.

11. The organic light emitting display device according to claim 8, wherein the data signal is set to a voltage lower than a voltage applied to the anode electrode of the organic light emitting diode.

12. The organic light emitting display device according to claim 8, further comprising:
a fourth transistor connected between the gate electrode of the first transistor and a second electrode of the first transistor, the fourth transistor being turned on when another of the scan signals is supplied to a current scan line;
a fifth transistor connected between the a first electrode of the first transistor and one of the data lines, the fifth transistor being turned on when the other of the scan signals is supplied to the current scan line;
a sixth transistor connected between the first electrode of the first transistor and a first power supply, the sixth transistor being turned off during a period of time when a light emitting control signal is supplied to a current light emitting control line and being turned on in another period; and
a seventh transistor connected to the second electrode of the first transistor and the organic light emitting diode, the seventh transistor being turned off when the light emitting control signal is supplied to the current light emitting control line and being turned on in the other period.

13. The organic light emitting display device according to claim 12, wherein the previous scan line is an i−1-th scan line, the current scan line is an i-th scan line, and the current light emitting control line is an i-th light emitting control line.

14. The organic light emitting display device according to claim 13, wherein the scan driving unit supplies the light emitting control signal to the current light emitting control line so as to overlap the light emitting control signal with scan signals supplied to the previous scan line and the current scan line.

15. The organic light emitting display device according to claim 12, further comprising a storage capacitor connected between the gate electrode of the first transistor and the first power supply.

* * * * *